(12) United States Patent
Yamada et al.

(10) Patent No.: US 12,142,055 B2
(45) Date of Patent: Nov. 12, 2024

(54) IMAGE PROCESSING DEVICE

(71) Applicant: HITACHI ASTEMO, LTD., Hitachinaka (JP)

(72) Inventors: Tetsuya Yamada, Hitachinaka (JP); Koji Doi, Hitachinaka (JP); Takeshi Shima, Hitachinaka (JP); Haruki Matono, Tokyo (JP); Hideaki Kido, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 91 days.

(21) Appl. No.: 17/794,898

(22) PCT Filed: Dec. 25, 2020

(86) PCT No.: PCT/JP2020/048697
§ 371 (c)(1),
(2) Date: Jul. 22, 2022

(87) PCT Pub. No.: WO2021/181825
PCT Pub. Date: Sep. 16, 2021

(65) Prior Publication Data
US 2023/0096864 A1 Mar. 30, 2023

(30) Foreign Application Priority Data
Mar. 11, 2020 (JP) .................................. 2020-041581

(51) Int. Cl.
*G06V 20/56* (2022.01)
*G06T 7/10* (2017.01)
*G06V 10/24* (2022.01)

(52) U.S. Cl.
CPC ................ *G06V 20/56* (2022.01); *G06T 7/10* (2017.01); *G06V 10/242* (2022.01); *G06T 2207/10144* (2013.01); *G06T 2207/30252* (2013.01)

(58) Field of Classification Search
CPC ........ G06V 20/56; G06V 10/242; G06T 7/10; G06T 2207/10144; G06T 2207/30252; G08G 1/16
See application file for complete search history.

(56) References Cited

U.S. PATENT DOCUMENTS

| | | | |
|---|---|---|---|
| 2017/0151850 A1 | 6/2017 | Deigmoller et al. | |
| 2017/0162055 A1 | 6/2017 | Lehner | |
| 2020/0031283 A1* | 1/2020 | Nakasho | B60R 1/00 |

FOREIGN PATENT DOCUMENTS

| | | |
|---|---|---|
| JP | 2015-018409 A | 1/2015 |
| JP | 2017-100705 A | 6/2017 |

(Continued)

OTHER PUBLICATIONS

International Search Report with English Translation and Written Opinion in International Application PCT/JP/2020/048697 mailed Apr. 20, 2021.

*Primary Examiner* — Alazar Tilahun
(74) *Attorney, Agent, or Firm* — Foley & Lardner LLP

(57) ABSTRACT

There is provided an image processing device capable of easily reducing a burden related to image recognition and obtaining stable recognition performance even when a posture of a vehicle changes from moment to moment. An image processing device 50 includes a storage unit 5 and an image processing unit 6. The storage unit 5 stores a pickup image acquired by an image pickup unit 4 mounted on the vehicle and an inclination angle transmitted from an inclination angle sensor 2 that detects the inclination angle of the vehicle. The image processing unit 6 performs image pro- (Continued)

cessing on the pickup image. The image processing unit 6 associates the pickup image in an inclined state with the inclination angle based on a time difference $\Delta t$ between a time from when the pickup image in the inclined state is acquired by the image pickup unit 4 until the acquired pickup image is stored in the storage unit 5, and a time from when the inclination angle is detected by the inclination angle sensor 2 until the detected inclination angle is stored in the storage unit 5. The image processing unit 6 generates a recognition image in a non-inclined state, which is used for image recognition of the pickup image, from the pickup image in the inclined state based on the inclination angle associated with the pickup image.

6 Claims, 12 Drawing Sheets

(56) References Cited

FOREIGN PATENT DOCUMENTS

| | | |
|---|---|---|
| JP | 2017-102928 A | 6/2017 |
| WO | WO-2020/039852 A1 | 2/2020 |

* cited by examiner

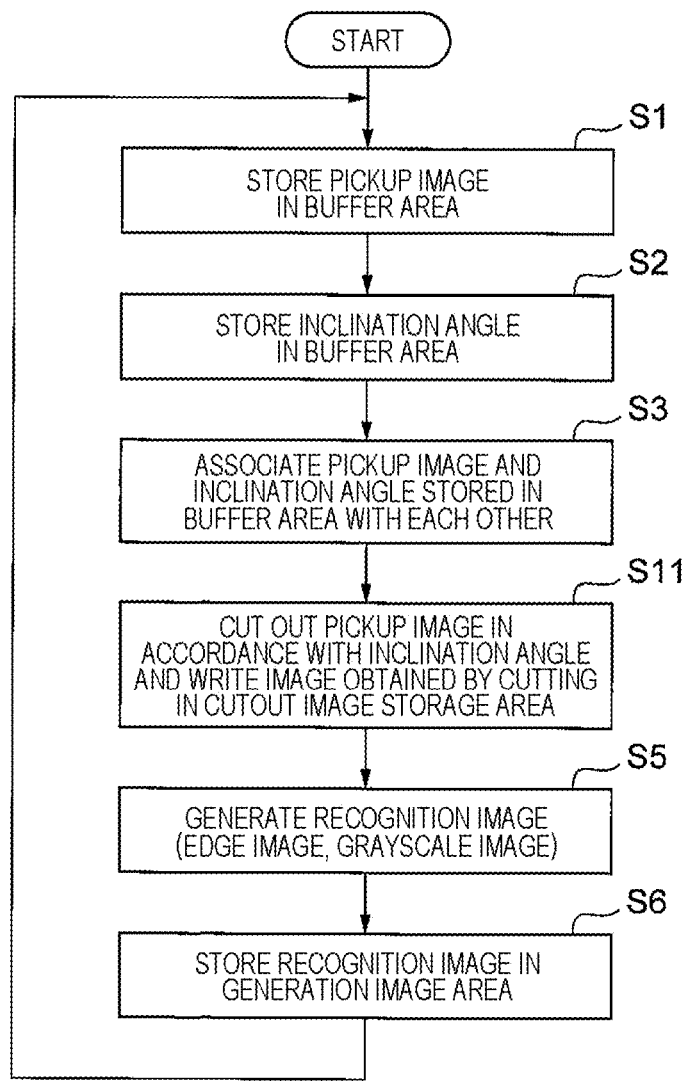

IMAGE PROCESSING DEVICE

TECHNICAL FIELD

The present invention relates to an image processing device.

BACKGROUND ART

In order to realize a safe and comfortable vehicular society, introduction of a driving support system and a prevention and safety system is in progress. For example, adaptive cruise control (ACC), which performs follow-up traveling while maintaining an inter-vehicle distance from a front vehicle within a set vehicle speed, has been introduced into many four-wheeled vehicles. In such a system, a sensing technique of picking up an image of the surroundings of a vehicle with an image pickup device mounted on the vehicle and detects the surrounding object by performing image recognition is used.

Differing from a four-wheeled vehicle, in a two-wheeled vehicle, the posture of the vehicle changes from moment to moment, for example, the vehicle travels on a curved road with the vehicle inclined. In a case where the above sensing technique is used for the two-wheeled vehicle, the inclined state of an image acquired by the image pickup device changes from moment to moment with the inclination of the vehicle. Thus, a burden related to image recognition is large.

As a technique for handling a point that an inclined state of an image acquired by an image pickup device changes, for example, there is a technique disclosed in PTL 1. PTL 1 discloses a two-wheeled vehicle drive recorder device that includes image pickup means for picking up an image of a predetermined range and outputting pickup image data, storage means for storing a portion of the pickup image data, detection means for detecting an inclination angle of a two-wheeled vehicle and outputting inclination angle data, and control means for extracting the portion of the pickup image data, which is stored in the storage means, in accordance with the inclination angle data.

CITATION LIST

Patent Literature

PTL 1: JP 2015-18409 A

SUMMARY OF INVENTION

Technical Problem

However, in the technique disclosed in PTL 1, there is no consideration for clarifying the correspondence relation between the pickup image data and the inclination angle data. Therefore, in a case where the inclined state of the pickup image data changes from moment to moment with the inclination of the vehicle, it is difficult to appropriately extract a portion of the pickup image data stored in the storage means in accordance with the inclination angle data, in the technique disclosed in PTL 1.

Thus, even though the technique disclosed in PTL 1 is applied to the above sensing technique, it is difficult to obtain stable recognition performance.

The present invention has been made in view of the above circumstances, and an object of the present invention is to provide an image processing device capable of easily reducing a burden related to image recognition and obtaining stable recognition performance even though a posture of a vehicle changes from moment to moment.

Solution to Problem

In order to solve the above problem, according to the present invention, an image processing device includes a storage unit that stores a pickup image acquired by an image pickup unit mounted on a vehicle and an inclination angle transmitted from an inclination angle sensor that detects the inclination of the vehicle, and an image processing unit that performs image processing on the pickup image stored in the storage unit. The storage unit stores the pickup image in an inclined state, which is acquired by the image pickup unit inclined in accordance with the inclination angle of the vehicle. The image processing unit associates the pickup image in the inclined state, which is stored in the storage unit, with the inclination angle based on a time difference between a time from when the inclination angle sensor detects the inclination angle until the detected inclination angle is stored in the storage unit, and a time from when the image pickup unit acquires the pickup image in the inclined state until the acquired pickup image is stored in the storage unit, and generates a recognition image in a non-inclined state, which is used for image recognition of the pickup image, from the pickup image in the inclined state, which is stored in the storage unit, based on the inclination angle associated with the pickup image.

Advantageous Effects of Invention

According to the present invention, it is possible to provide an image processing device capable of easily reducing a burden related to image recognition and obtaining stable recognition performance even though a posture of a vehicle changes from moment to moment.

Objects, configurations, and advantageous effects other than those described above will be clarified by the descriptions of the following embodiments.

BRIEF DESCRIPTION OF DRAWINGS

FIG. 12 is a flowchart illustrating a flow of processing performed by the image processing device illustrated in FIG. 10.

DESCRIPTION OF EMBODIMENTS

Hereinafter, embodiments of the present invention will be described with reference to the drawings. Components denoted by the same reference signs in the respective embodiments have similar functions in the respective embodiments unless otherwise specified. The description thereof will be omitted.

Embodiment 1

Figure 1:
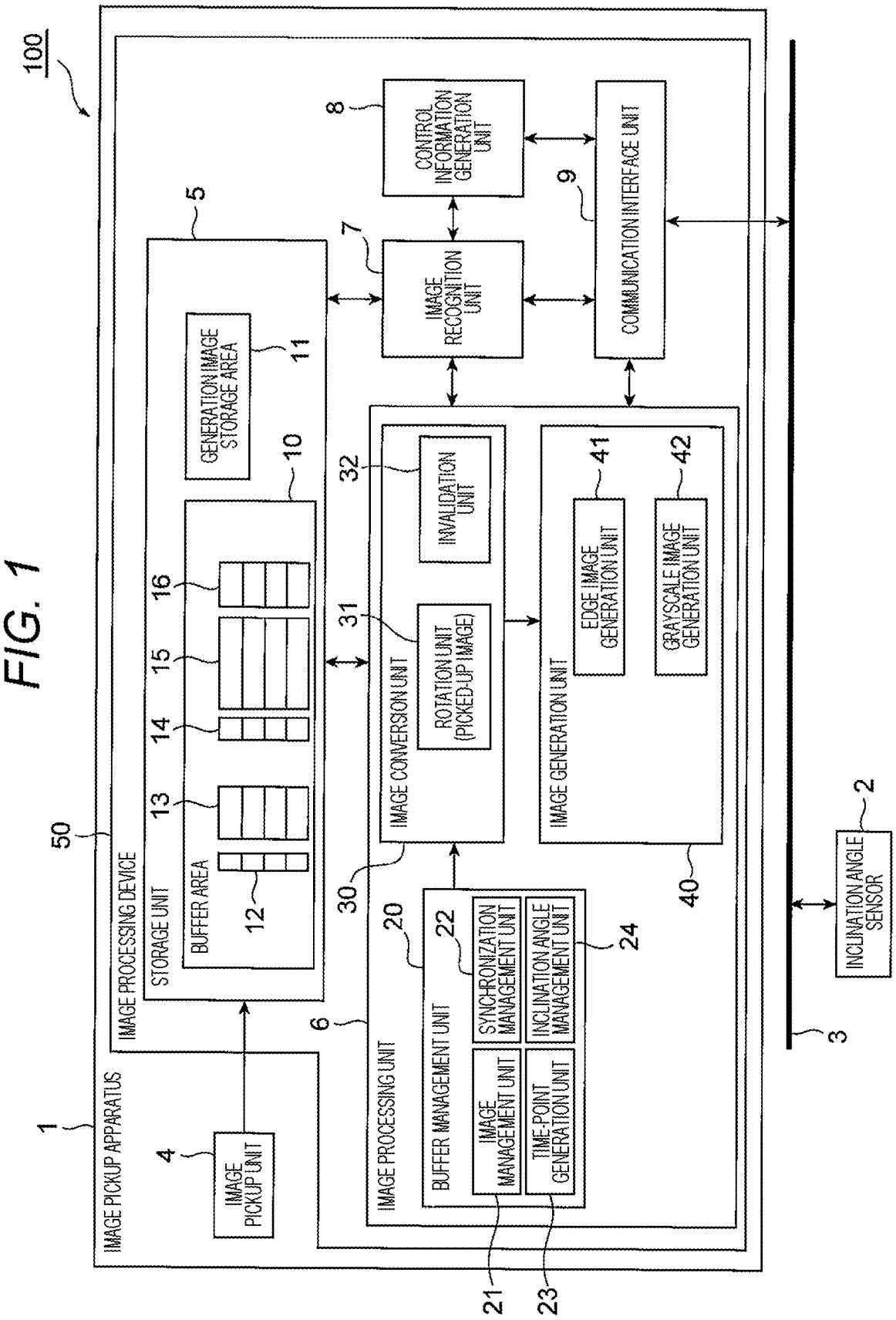
FIG. 1 is a configuration diagram of a sensing system including an image processing device according to Embodiment 1.

FIG. 1 is a configuration diagram of a sensing system 100 including an image processing device 50 according to Embodiment 1.

The sensing system 100 is a sensing system that picks up an image of the surroundings of a vehicle with an image pickup apparatus 1 mounted on a vehicle and detects the surrounding object by performing image recognition. The sensing system 100 is a system mounted on a motorcycle in which the posture of the vehicle changes from moment to moment, but can also be used by being mounted on a four-wheeled vehicle such as an automobile.

The sensing system 100 includes an image pickup apparatus 1 that picks up an image of the surrounding of a vehicle, an inclination angle sensor 2 that detects an inclination angle of the vehicle, and a bus 3 for communication, that connects the image pickup apparatus 1 and the inclination angle sensor 2.

The inclination angle sensor 2 includes, for example, an inertial measurement unit (IMU). The inclination angle sensor 2 detects a three-dimensional angle including an inclination angle of the vehicle, an angular velocity, and an acceleration. The inclination angle of the vehicle refers to at least one of a roll angle, a pitch angle, and a yaw angle. The roll angle indicates an inclination amount of the vehicle when the vehicle is inclined with a z-axis extending in a front-rear direction of the vehicle as a rotation axis. The pitch angle indicates an inclination amount of the vehicle when the vehicle is inclined with an x-axis extending in a left-right direction of the vehicle as a rotation axis. The yaw angle indicates an inclination amount of the vehicle when the vehicle is inclined with a y-axis extending in an up-down direction of the vehicle as a rotation axis. In the present embodiment, the roll angle inclined with the front-rear direction of the vehicle as the rotation axis will be described as an example of the inclination angle of the vehicle.

The inclination angle sensor 2 encodes information of the detected inclination angle and the like into a data format conforming to a communication protocol applied to the bus 3 such as a controller area network (CAN) or Ethernet. Then, the inclination angle sensor 2 transmits the encoded information to the image processing device 50 via the bus 3. The inclination angle is stored in a buffer area 10 (described later) in the storage unit 5. The inclination angle sensor 2 only needs to be a sensor capable of detecting the inclination angle in real time, and is not limited to the inertial measurement unit.

The image pickup apparatus 1 includes an image pickup unit 4, a storage unit 5, an image processing unit 6, an image recognition unit 7, a control information generation unit 8, and a communication interface unit 9. In the present embodiment, the storage unit 5, the image processing unit 6, the image recognition unit 7, the control information generation unit 8, and the communication interface unit 9 are also collectively referred to as an "image processing device 50".

The image pickup unit 4 includes a camera module including an imaging element such as a complementary metal oxide semiconductor (CMOS) sensor and a lens unit. The camera module constituting the image pickup unit 4 is a so-called monocular camera, but may be a stereo camera. The image pickup unit 4 is mounted on the vehicle to face forward in a traveling direction of the vehicle, and is inclined in accordance with the inclination angle of the vehicle. The image pickup unit 4 picks up an image of the surrounding of the vehicle. When picking up an image of the surrounding of the vehicle in a state where the vehicle is inclined, the image pickup unit 4 acquires an image inclined in accordance with the inclination angle of the vehicle. In the present embodiment, the image acquired by the image pickup unit 4 is also referred to as a "pickup image". The image acquired by the image pickup unit 4 inclined in accordance with the inclination angle of the vehicle is also referred to as a "pickup image in an inclined state". The pickup image is stored in the buffer area 10 in the storage unit 5.

The image processing device 50 is a device that processes the pickup image acquired by the image pickup unit 4, detects an object existing around the vehicle, such as a road, a vehicle, a pedestrian, or an obstacle, and generates control information or the like of an actuator that actuates a brake or an accelerator. The image processing device 50 is realized by cooperation of hardware such as a microcomputer, a field-programmable gate array (FPGA), and a memory, and software including a program describing contents of various types of processing.

The storage unit 5 includes a memory that temporarily stores various types of information. The storage unit 5 has a plurality of storage areas. The plurality of storage areas included in the storage unit 5 include the buffer area 10 and a generation image storage area 11. The buffer area 10 is a storage area for storing the pickup image acquired by the image pickup unit 4 and the inclination angle transmitted by the inclination angle sensor 2. The buffer area 10 stores the pickup image in the inclined state. The buffer area 10 corresponds to an example of a first storage area in the present invention. The generation image storage area 11 is a storage area for storing various images generated by the image processing unit 6.

The image processing unit 6 performs image processing on the pickup image stored in the storage unit 5, and generates a recognition image used for image recognition in the image recognition unit 7. The image processing unit 6 includes a buffer management unit 20, an image conversion unit 30, and an image generation unit 40.

The buffer management unit 20 generates and manages information stored in the buffer area 10 in the storage unit 5.

Specifically, the buffer management unit 20 includes a time-point generation unit 23 that is configured by a timer and generates a timestamp, an image management unit 21 that manages the pickup image stored in the buffer area 10, and an inclination angle management unit 24 that manages the inclination angle stored in the buffer area 10. The buffer management unit 20 further includes a synchronization management unit 22 that associates the pickup image stored in the buffer area 10 with the inclination angle. Details of processing of the buffer management unit 20 related to the association between the pickup image and the inclination angle will be described later with reference to FIGS. 3 and 4.

The image conversion unit 30 converts the pickup image in the inclined state, which is stored in the buffer area 10, into the pickup image in a non-inclined state based on the inclination angle associated with the pickup image in the inclined state. Specifically, the image conversion unit 30 includes a rotation unit 31 and an invalidation unit 32. The rotation unit 31 performs rotation processing of rotating the pickup image in the inclined state, which is stored in the buffer area 10. The invalidation unit 32 invalidates a pixel having no information by the rotation processing. Details of processing of the image conversion unit 30 that converts the pickup image in the inclined state into the pickup image in the non-inclined state will be described later with reference to FIG. 2.

The image generation unit 40 generates a recognition image used for image recognition of the pickup image. Specifically, the image generation unit 40 includes an edge image generation unit 41 that performs edge extraction processing on the pickup image to generate an edge image, and a grayscale image generation unit 42 that performs grayscale conversion processing on the pickup image to generate a grayscale image. Each of the edge image and the grayscale image is one of recognition images used for image recognition. The generated recognition image is stored in the generation image storage area 11 in the storage unit 5.

Furthermore, the image generation unit 40 may generate a matching image as the recognition image in addition to the edge image and the grayscale image. The matching image is an image used when the image recognition unit 7 performs image recognition, and is an image obtained by cutting out a portion of the pickup image. In this case, the sensing system 100 may include a radar that measures the position and the distance of an object existing around the vehicle, and may transmit object information including a measurement result of the radar to the image processing device 50 via the bus 3. The image generation unit 40 specifies an object in the pickup image after the rotation processing (pickup image in the non-inclined state) based on the measurement result of the radar, and cuts out a predetermined pixel area including the specified object, from the pickup image after the rotation processing (pickup image in the non-inclined state). In this manner, the image generation unit 40 can generate the matching image.

The image recognition unit 7 performs image recognition of the pickup image by using the recognition image generated by the image processing unit 6, and detects an object around the vehicle. Specifically, the image recognition unit 7 reads the recognition image stored in the generation image storage area 11 in the storage unit 5, and performs pattern recognition or the like from the features of the recognition image. In this manner, the image recognition unit 7 identifies the object appearing in the pickup image. Furthermore, when performing image recognition, the image recognition unit 7 can identify an object appearing in the pickup image in a manner that a machine learned identifier of the image recognition unit 7 performs matching processing or the like by using the matching image that is one of recognition images. Furthermore, the image recognition unit 7 tracks the movement of the identified object by performing tracking processing or the like by using a plurality of recognition images generated from a plurality of pickup images acquired at different pickup timings. Thus, the image recognition unit 7 can detect an object around the vehicle.

The control information generation unit 8 generates, based on the detection result of the image recognition unit 7, control information necessary for vehicle traveling control, alarm notification, and the like, such as control information of an actuator that operates a brake or an accelerator. The control information generated by the control information generation unit 8 is transmitted to a vehicle control device including an electronic control unit (ECU) and the like.

The communication interface unit 9 communicates with the inclination angle sensor 2 and the vehicle control device via the bus 3. In particular, the communication interface unit 9 encodes the control information generated by the control information generation unit 8 into a data format conforming to the communication protocol applied to the bus 3, and transmits the encoded data to the vehicle control device. Upon receiving a message including the inclination angle transmitted from the inclination angle sensor 2, the communication interface unit 9 decodes the message into the data format of the image processing device 50 to acquire the inclination angle, and outputs the inclination angle to the image processing unit 6.

Figure 2:
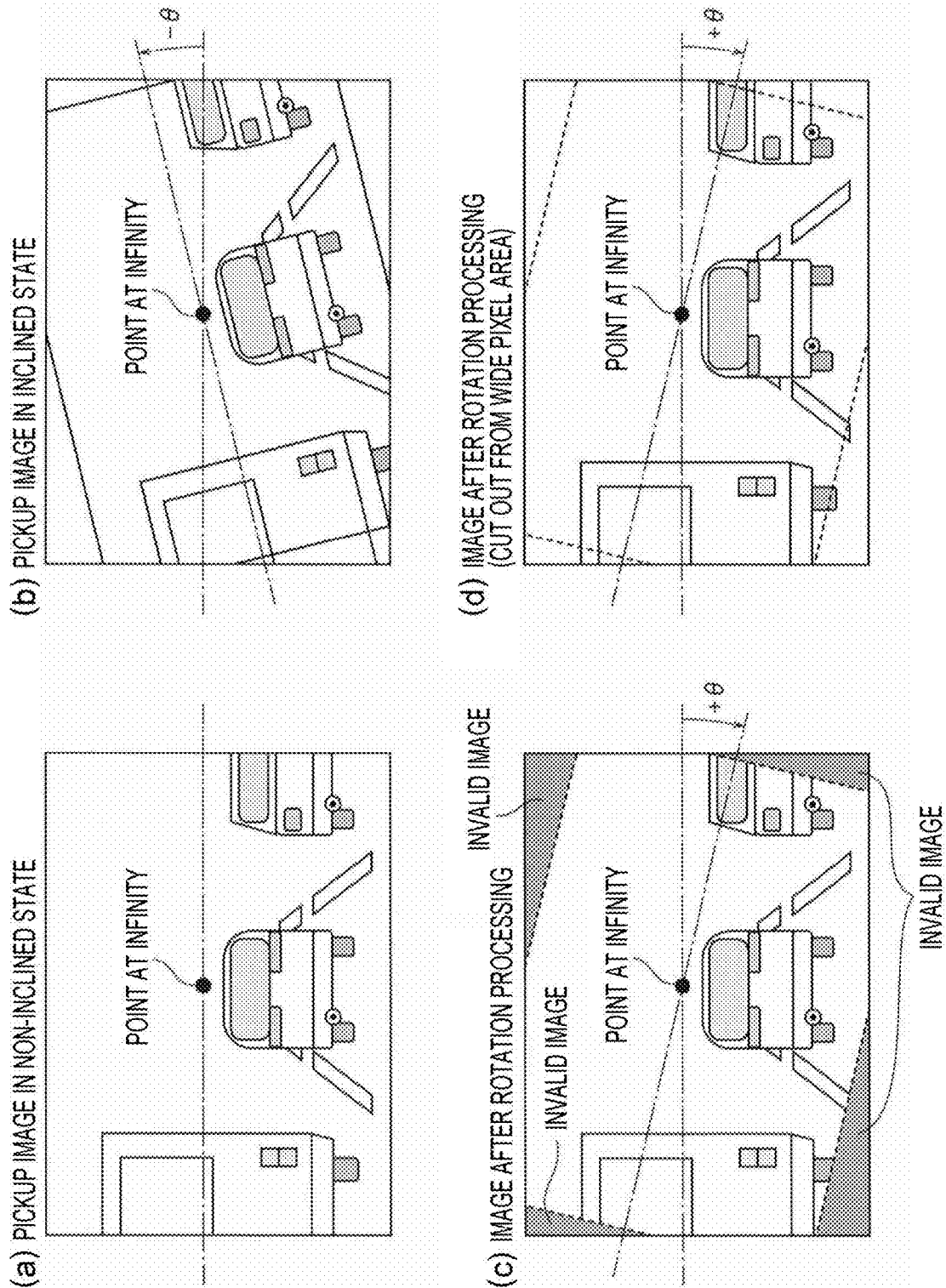
FIG. 2(a) is a view illustrating an example of a pickup image in a non-inclined state.
FIG. 2(b) is a view illustrating an example of a pickup image in an inclined state.
FIG. 2(c) is a view illustrating an example of an image obtained by performing rotation processing on the image illustrated in FIG. 2(b)
FIG. 2(d) is a view illustrating another example of an image obtained by performing the rotation processing on the image illustrated in FIG. 2(b).

FIG. 2 is a view illustrating processing of the image conversion unit 30 illustrated in FIG. 1. FIG. 2(a) is a view illustrating an example of the pickup image in the non-inclined state. FIG. 2(b) is a view illustrating an example of the pickup image in the inclined state. FIG. 2(c) is a view illustrating an example of an image obtained by performing rotation processing on the image illustrated in FIG. 2(b). FIG. 2(d) is a view illustrating another example of the image obtained by performing rotation processing on the image illustrated in FIG. 2(b).

It is assumed that the images illustrated in FIGS. 2(a) to 2(d) are pickup images acquired by cutting out a portion of a pixel area of the image pickup unit 4 to have a rectangular shape. FIG. 2(a) illustrates the pickup image in the non-inclined state, which is acquired by the image pickup unit 4 when the vehicle is in the non-inclined state, and shows three preceding vehicles. FIG. 2(b) illustrates the pickup image in the inclined state, which is acquired by the image pickup unit 4 in a state where the vehicle is inclined by an inclination angle ($-\theta$) with respect to FIG. 2(a). That is, in FIG. 2(b), the pickup image is inclined counterclockwise by an angle $\theta$ with the z-axis passing through the point at infinity and extending in the front-rear direction of the vehicle, as the rotation axis. When the pickup image in the inclined state as illustrated in FIG. 2(b) is acquired, the pickup image in the inclined state is stored in the buffer area 10 in association with the inclination angle ($-\theta$).

The rotation unit 31 in the image conversion unit 30 performs rotation processing of rotating the pickup image in the inclined state illustrated in FIG. 2(b), in accordance with the inclination angle ($-\theta$) associated with the pickup image. Specifically, the rotation unit 31 rotates the pickup image by an angle $\theta$ in the opposite direction (clockwise) to the direction in FIG. 2(b) with the z-axis passing through the point at infinity and extending in the front-rear direction of the vehicle, as the rotation axis. With the rotation processing, the pickup image in the inclined state illustrated in FIG. 2(b) is converted into the pickup image in the non-inclined state as illustrated in FIG. 2(c).

As illustrated in FIG. 2(c), the invalidation unit 32 in the image conversion unit 30 invalidates a pixel having no information due to the rotation processing, by adding an invalid image such as a black image to the pixel having no information due to the rotation processing. By the invalidation, it is possible to suppress an occurrence of erroneous detection when image recognition is performed on the pickup image in the non-inclined state illustrated in FIG. 2(c).

The invalidation unit 32 may perform another processing instead of the processing of adding an invalid image as illustrated in FIG. 2(c). For example, the invalidation unit 32 can substitute the processing of adding the invalid image, by enlarging and setting the size of a cutout area in the following manner when the pickup image is acquired by cutting out a portion of the pixel area of the image pickup unit 4 to have a rectangular shape. That is, even when the pickup image is rotated at the maximum inclination angle (−90 degrees or 90 degrees) with the z-axis passing through the point at infinity and extending in the front-rear direction of the vehicle, as the rotation axis, the invalidation unit 32 enlarges and sets the size of the cutout area to a size at which a pixel having no information is not provided within the cutout area. Thus, as illustrated in FIG. 2(d), there is no pixel having no information even though the rotation processing is performed, and thus it is not necessary to add an invalid image.

As described above, the image conversion unit 30 can convert the pickup image in the inclined state into the pickup image in the non-inclined state by rotating the pickup image in accordance with the inclination angle associated with the pickup image in the inclined state. The image generation unit 40 can generate a recognition image in the non-inclined state from the pickup image in the non-inclined state. As a result, the image processing device 50 can always perform image recognition of the pickup image by using the recognition image in the non-inclined state even though the posture of the vehicle changes from moment to moment.

As compared with the pickup image and the recognition image in the non-inclined state, the pickup image and the recognition image in the inclined state have a large number of variations depending on the difference in the inclination angle even in the image showing the same object. In order to perform image recognition on the pickup image or the recognition image in the inclined state, it is necessary to create a dictionary by causing the identifier of the image recognition unit 7 to learn an enormous number of learning images covering a large number of variations. Therefore, a large amount of resources are consumed, and a processing load of image recognition is also increased since the dictionary becomes enormous. That is, performing image recognition on the pickup image or the recognition image in the inclined state imposes a larger various burden than performing image recognition on the pickup image or the recognition image in the non-inclined state.

Since the image processing device 50 can always perform image recognition on the pickup image and the recognition image in the non-inclined state even though the posture of the vehicle changes from moment to moment, it is possible to reduce the burden related to image recognition. Moreover, the image processing device 50 can utilize an image recognition engine for a four-wheeled vehicle in which image recognition is often performed on the pickup image or the recognition image in the non-inclined state. Thus, the image processing device 50 can easily reduce the burden related to image recognition even though the posture of the vehicle changes from moment to moment. Furthermore, the image processing device 50 can convert the pickup image in the inclined state into the pickup image in the non-inclined state and generate the recognition image in the non-inclined state by simple processing such as rotation processing. Therefore, even though the posture of the vehicle changes from moment to moment, it is possible to more easily reduce the burden related to image recognition.

Figure 3:
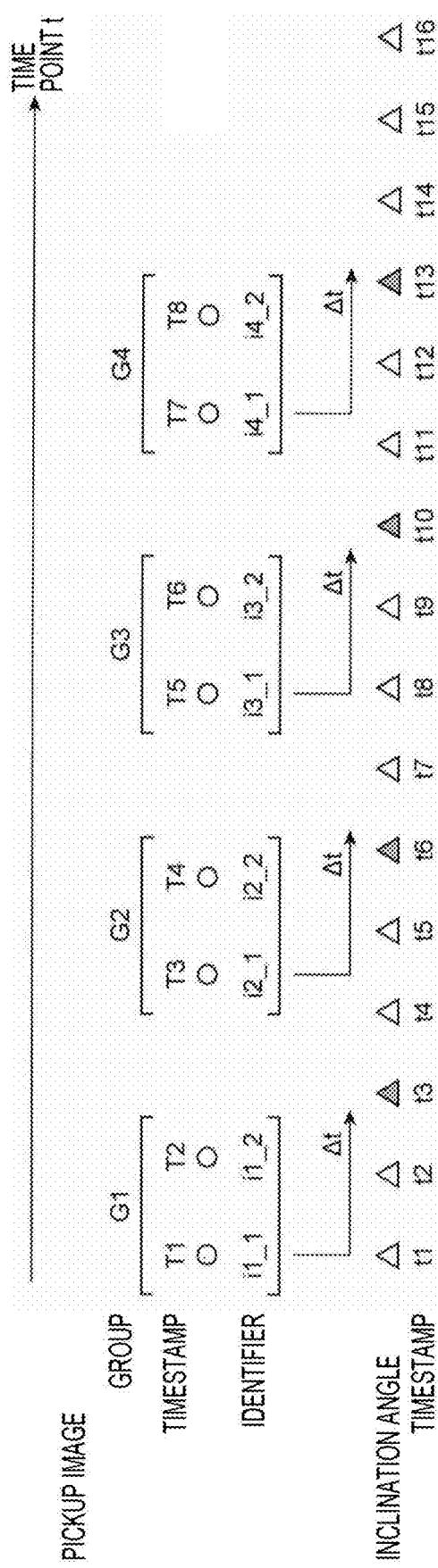
FIG. 3 is a diagram for explaining processing of a buffer management unit illustrated in FIG. 1.
Figure 4:
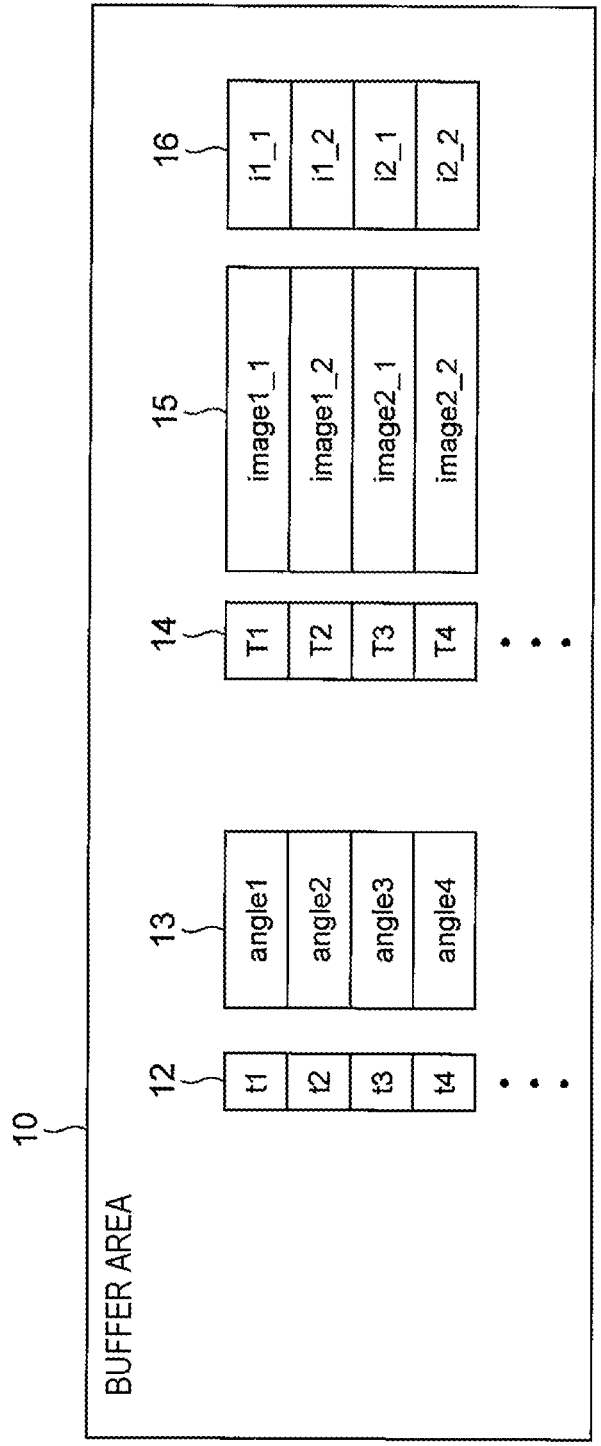
FIG. 4 is a diagram for explaining a buffer area illustrated in FIG. 1.

FIG. 3 is a diagram for explaining processing of the buffer management unit 20 illustrated in FIG. 1. FIG. 4 is a diagram for explaining the buffer area 10 illustrated in FIG. 1.

The image pickup unit 4 can acquire a plurality of pickup images having different exposure times for each predetermined pickup cycle. For example, the image pickup unit 4 can acquire, at a certain pickup timing, two pickup images being a normal pickup image picked up in a normal exposure time and a special pickup image picked up in a special exposure time different from the normal exposure time. The normal pickup image is, for example, an image as illustrated in FIG. 2(a) or 2(b), and is a pickup image acquired for detecting an object existing around the vehicle, such as a lane marking or a shape of a road, a vehicle, a pedestrian, or an obstacle. The special pickup image is a pickup image acquired for detecting color information of a tail lamp, a traffic light, an electric bulletin board, or the like of the vehicle. The normal pickup image and the special pickup image are stored in the buffer area 10 in the storage unit 5 as indicated by the reference sign 15 in FIG. 4. The image pickup unit 4 can acquire a plurality of pickup images other than the two images being the normal pickup image and the special pickup image.

The image management unit 21 in the buffer management unit 20 adds a timestamp generated by the time-point generation unit 23 to the pickup image stored in the buffer area 10. The image management unit 21 adds, to the pickup image, a timestamp indicating the time point when the pickup image is stored in the buffer area 10. FIG. 3 illustrates an example in which timestamps indicating the respective time points T1 to T8 are added to pickup images in order in which the pickup images are stored in the buffer area 10. As indicated by the reference sign 14 in FIG. 4, the timestamp added to the pickup image is stored in one-to-one correspondence with the pickup image in the buffer area 10 in the storage unit 5.

Furthermore, the image management unit 21 manages a plurality of pickup images acquired at predetermined pickup cycles, as a group. That is, a plurality of pickup images included in one group are images picked up by the image pickup unit 4 at the same pickup timing. In the example in FIG. 3, one group includes two pickup images of a normal pickup image and a special pickup image. In the example in FIG. 3, a group G1 includes a normal pickup image to which a timestamp indicating the time point T1 is added and a special pickup image to which a timestamp indicating the time point T2 is added. A group G2 includes a normal pickup image to which a timestamp indicating the time point T3 is added and a special pickup image to which a timestamp indicating the time point T4 is added. A group G3 includes a normal pickup image to which a timestamp indicating the time point T5 is added and a special pickup image to which a timestamp indicating the time point T6 is added. A group G4 includes a normal pickup image to which a timestamp indicating the time point T7 is added and a special pickup image to which a timestamp indicating the time point T8 is added. The difference between the plurality of groups can be determined from the attribute information added to the pickup image by the image pickup unit 4 when the pickup image is acquired, even when the pickup cycle is very short.

The image management unit 21 adds an identifier for grasping a group to which the pickup image belongs, to the pickup image stored in the buffer area 10. In the example in FIG. 3, an identifier i1_1 is added to the normal pickup image to which the timestamp indicating the time point T1 is added, and an identifier i1_2 is added to the special pickup image to which the timestamp indicating the time point T2 is added. An identifier i2_1 is added to the normal pickup image to which the timestamp indicating the time point T3 is added, and an identifier i2_2 is added to the special pickup image to which the timestamp indicating the time point T4 is added. An identifier i3_1 is added to the normal pickup image to which the timestamp indicating the time point T5 is added, and an identifier i3_2 is added to the special pickup image to which the timestamp indicating the time point T6 is added. An identifier i4_1 is added to the normal pickup image to which the timestamp indicating the time point T7 is added, and an identifier i4_2 is added to the special pickup image to which the timestamp indicating the time point T8 is added. As indicated by the reference sign 16 in FIG. 4, the identifier added to the pickup image is stored in one-to-one correspondence with the pickup image in the buffer area 10 in the storage unit 5.

The inclination angle sensor 2 detects the inclination angle at a predetermined detection cycle and transmits the inclination angle to the image processing device 50 via the bus 3. The detection cycle of the inclination angle sensor 2 may be the same as or different from the pickup cycle of the image pickup unit 4. In the present embodiment, it is assumed that the detection cycle of the inclination angle sensor 2 is shorter than the pickup cycle of the image pickup unit 4. The inclination angle transmitted from the inclination angle sensor 2 is stored in the buffer area 10 of the storage unit 5, as indicated by the reference sign 13 in FIG. 4.

The inclination angle management unit 24 in the buffer management unit 20 adds a timestamp generated by the time-point generation unit 23 to the inclination angle stored in the buffer area 10. The inclination angle management unit 24 adds, to the inclination angle, a timestamp indicating the time point when the inclination angle is stored in the buffer area 10. FIG. 3 illustrates an example in which timestamps indicating the respective time points t1 to t16 are added to inclination angles in order in which the inclination angles are stored in the buffer area 10. As indicated by the reference sign 12 in FIG. 4, the timestamp added to the inclination angle is stored in one-to-one correspondence with the inclination angle in the buffer area 10 in the storage unit 5.

The synchronization management unit 22 in the buffer management unit 20 associates the same inclination angle with a plurality of pickup images managed as one group by the image management unit 21. That is, the synchronization management unit 22 associates the same inclination angle with a plurality of images picked up by the image pickup unit 4 at the same pickup timing.

Here, the transmission distance of the inclination angle transmitted from the inclination angle sensor 2 via the bus 3 and then stored in the buffer area 10 is longer than the transmission distance of the pickup image stored in the buffer area 10 from the image pickup unit 4 without passing via the bus 3. Therefore, a first required time required from when the inclination angle is detected by the inclination angle sensor 2 until the inclination angle is stored in the buffer area 10 is longer than a second required time required from when the pickup image is acquired by the image pickup unit 4 until the pickup image is stored in the buffer area 10. When a time obtained by subtracting the second required time from the first required time is set as a time difference $\Delta t$, the inclination angle detected by the inclination angle sensor 2 at the same time point as a time point when the pickup image is acquired by the image pickup unit 4 is stored in the buffer area 10 at a time point obtained by adding the time difference $\Delta t$ to the time point when the pickup image is stored in the buffer area 10. In other words, the time point when the pickup image acquired at a certain pickup timing is stored in the buffer area 10 and the time point when the inclination angle detected at a detection timing which is the same as the pickup timing is stored in the buffer area 10 have a time difference of $\Delta t$. The time difference $\Delta t$ is a value determined in advance by a specification or a structure of the sensing system 100. The synchronization management unit 22 associates the pickup image and the inclination angle stored in the buffer area 10 with each other based on the time difference $\Delta t$.

Specifically, first, the synchronization management unit 22 specifies one time point from the respective time points when a plurality of pickup images managed as one group are stored in the buffer area 10. For example, the synchronization management unit 22 specifies the earliest time point among the respective time points when the plurality of pickup images managed as one group are stored in the buffer area 10. In the example in FIG. 3, the time point T1 is specified for the group G1, the time point T3 is specified for the group G2, the time point T5 is specified for the group G3, and the time point T7 is specified for the group G4. The synchronization management unit 22 calculates a predetermined time point obtained by adding the time difference $\Delta t$ to the specified time point, for each group. The synchronization management unit 22 compares the calculated predetermined time point with the time point when the inclination angle is stored in the buffer area 10. The synchronization management unit 22 searches for the inclination angle stored in the buffer area 10 at the time point closest to the predetermined time point among the time points when the inclination angle is stored in the buffer area 10. The synchronization management unit 22 associates the searched inclination angle with the plurality of pickup images included in the group corresponding to the predetermined time point.

In the example in FIG. 3, in the case of the group G1, the inclination angle (angle3) to which the timestamp indicating the time point t3 closest to the predetermined time point (T1+$\Delta t$) obtained by adding the time difference $\Delta t$ to the specified time point T1 is added is associated with the pickup image (image1_1) and the special pickup image (image1_2) to which the timestamp indicating the time point T1 being a calculation source of the predetermined time point (T1+$\Delta t$) is added. The synchronization management unit 22 holds an address of a place where the inclination angle and the plurality of pickup images associated with each other are stored in the buffer area 10.

As described above, the synchronization management unit 22 can associate the pickup image and the inclination angle in the inclined state, which are stored in the buffer area 10, with each other based on the time difference $\Delta t$ between the time from when the inclination angle is detected by the inclination angle sensor 2 until the detected inclination angle is stored in the buffer area 10 and the time from when the pickup image in the inclined state is acquired by the image pickup unit 4 until the acquired pickup image is stored in the buffer area 10. Thus, the image processing device 50 can appropriately synchronize the pickup image in the inclined state, which is acquired at a certain pickup timing, with the inclination angle detected at the detection timing which is the same as the pickup timing.

When the pickup image and the inclination angle in the inclined state are not appropriately synchronized with each other, there is a high possibility that it is not possible to obtain the pickup image in the non-inclined state even when the rotation processing is performed on the pickup image in the inclined state. In this case, there is a high possibility that the image processing device 50 erroneously recognizes the pickup image in the inclined state as the pickup image in the non-inclined state, generates the recognition image in the inclined state, and performs image recognition. Therefore, there is a high possibility that an erroneous recognition result is obtained.

Since the image processing device 50 can appropriately synchronize the pickup image in the inclined state with the inclination angle, the image processing device 50 can convert the pickup image in the inclined state into the pickup image in the non-inclined state in real time to generate the recognition image in the non-inclined state. Thus, it is possible to always obtain a correct recognition result. Therefore, the image processing device 50 can obtain stable recognition performance even though the posture of the vehicle changes from moment to moment.

In particular, even when a plurality of pickup images having different exposure times are acquired for each pickup cycle, the image processing device 50 can manage the plurality of pickup images as a group and associate the plurality of pickup images managed as one group with the inclination angle. Thus, even when a plurality of pickup images having different exposure times are acquired for each pickup cycle, the image processing device 50 can appropriately synchronize a plurality of pickup images acquired at a certain pickup timing, with the inclination angle detected at the detection timing which is the same as the pickup timing. Therefore, the image processing device 50 can generate the recognition image in the non-inclined state by converting the pickup image in the inclined state into the pickup image in the non-inclined state in real time, and thus it is possible to always obtain a correct recognition result. Moreover, since image recognition is performed by using a plurality of pickup images having different exposure times, it is possible to enhance the recognition performance. Therefore, the image processing device 50 can obtain stable and high recognition performance even though the posture of the vehicle changes from moment to moment.

Figure 5:
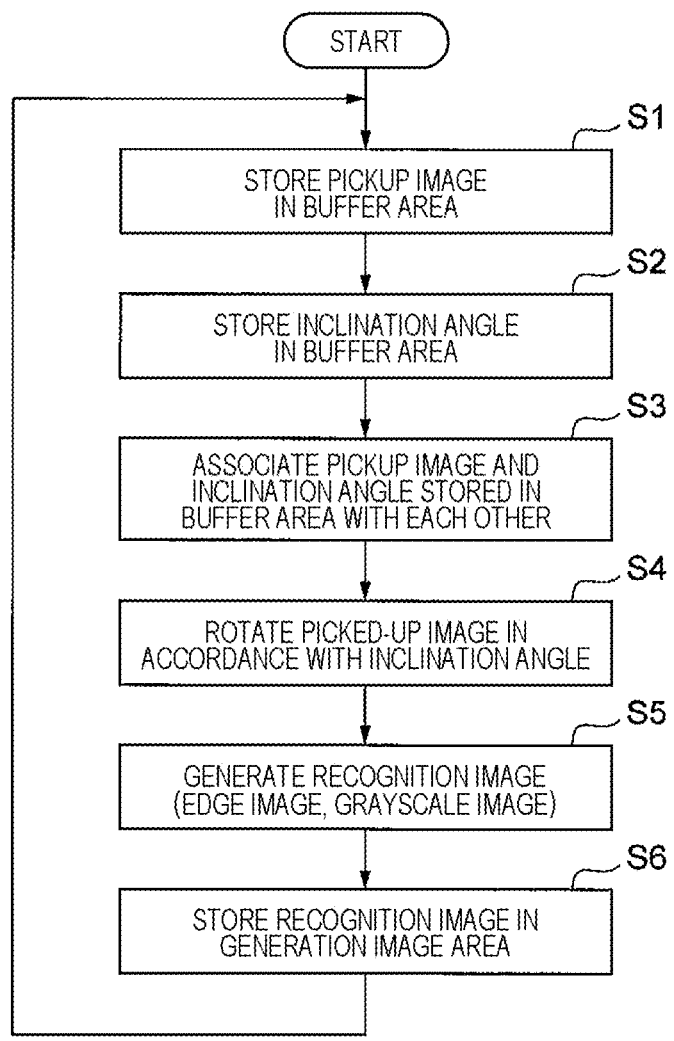
FIG. 5 is a flowchart illustrating a flow of processing performed by the image processing device illustrated in FIG. 1.

FIG. 5 is a flowchart illustrating a flow of processing performed by the image processing device 50 illustrated in FIG. 1.

In Step S1, the image processing device 50 stores a pickup image acquired by the image pickup unit 4, in the buffer area 10 in the storage unit 5. The image processing device 50 adds a timestamp and an identifier to the pickup image and stores the pickup image at a place having a predetermined address in the buffer area 10.

In Step S2, the image processing device 50 stores an inclination angle transmitted by the inclination angle sensor 2, in the buffer area 10. Upon receiving a message including the inclination angle transmitted from the inclination angle sensor 2 via the bus 3, the image processing device 50 decodes the message by the communication interface unit 9 to acquire the inclination angle, and stores the inclination angle in the buffer area 10. The image processing device 50 adds a timestamp to the inclination angle and stores the timestamp at a place having a predetermined address in the buffer area 10.

In Step S3, the image processing device 50 associates the pickup image and the inclination angle stored in the buffer area 10 with each other based on a predetermined time difference $\Delta t$. The image processing device 50 searches for the inclination angle stored in the buffer area 10 at a time point closest to a predetermined time point $(T+\Delta t)$ obtained by adding the time difference $\Delta t$ to the time point T at which the pickup image is stored in the buffer area 10. The image processing device 50 associates the searched inclination angle with the pickup image stored in the buffer area 10 at the time point T that is the calculation source of the predetermined time point $(T+\Delta t)$.

In Step S4, the image processing device 50 rotates the pickup image in the inclined state, which is stored in the buffer area 10, in accordance with the inclination angle associated with the pickup image. The image processing device 50 reads the inclination angle and the pickup image associated with each other from the buffer area 10, and performs rotation processing. The image processing device 50 designates the address of a place in which the pickup image and the inclination angle associated with each other are stored in the buffer area 10, and reads the pickup image and the inclination angle. The image processing device 50 can convert the pickup image in the inclined state into the pickup image in the non-inclined state by rotating the read pickup image according to the read inclination angle.

In Step S5, the image processing device 50 generates a recognition image in the non-inclined state from the pickup image after the rotation processing (the pickup image in the non-inclined state). The generated recognition image is, for example, an edge image or a grayscale image. The image processing device 50 may generate another recognition image such as a matching image.

In Step S6, the image processing device 50 stores the generated recognition image in the generation image storage area 11 in the storage unit 5. Then, the image processing device 50 can detect an object around the vehicle by reading the recognition image stored in the generation image storage area 11, and performing image recognition by using the recognition image. The image processing device 50 repeats the processing illustrated in FIG. 5 for each predetermined pickup cycle of the image pickup unit 4.

As described above, the image processing device 50 according to the present embodiment associates the pickup image and the inclination angle in the inclined state, which are stored in the buffer area 10, with each other based on the time difference $\Delta t$ between the time from when the inclination angle is detected by the inclination angle sensor 2 until the detected inclination angle is stored in the buffer area 10 and the time from when the pickup image in the inclined state is acquired by the image pickup unit 4 until the acquired pickup image is stored in the buffer area 10. Then, the image processing device 50 according to the present embodiment converts the pickup image in the inclined state, which is stored in the buffer area 10, into the pickup image in the non-inclined state based on the inclination angle associated with the pickup image, and generates the recognition image in the non-inclined state.

Thus, the image processing device 50 according to the present embodiment can appropriately synchronize the pickup image in the inclined state with the inclination angle even though the posture of the vehicle changes from moment to moment like a motorcycle. Thus, the image processing device 50 can always convert the pickup image in the inclined state into the pickup image in the non-inclined state and generate the recognition image in the non-inclined state. Therefore, the image processing device 50 according to the present embodiment can always perform image recognition by using the recognition image in the non-inclined state even though the posture of the vehicle changes from moment to moment. Accordingly, the image processing device 50 according to the present embodiment can easily reduce the burden related to image recognition and obtain stable recognition performance, even though the posture of the vehicle changes from moment to moment.

Embodiment 2

A sensing system 100 according to Embodiment 2 will be described with reference to FIGS. 6 and 7. In the description of Embodiment 2, the description of the similar configuration and operation as those in Embodiment 1 will be omitted.

Figure 6:
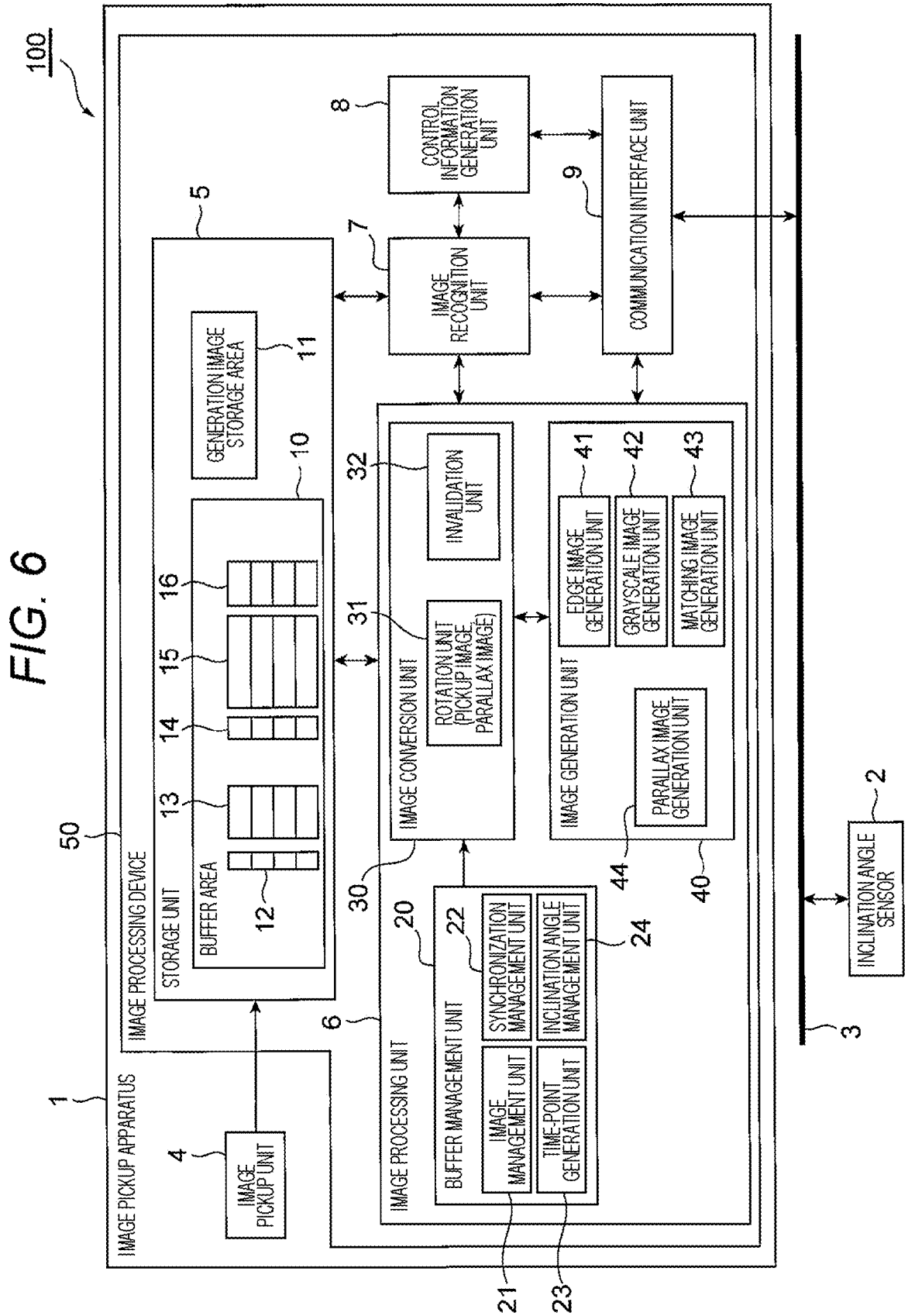
FIG. 6 is a configuration diagram of a sensing system including an image processing device according to Embodiment 2.

FIG. 6 is a configuration diagram of a sensing system 100 including an image processing device 50 according to Embodiment 2.

In the sensing system 100 according to Embodiment 2, the image pickup unit 4 includes a stereo camera. That is, the image pickup unit 4 according to Embodiment 2 includes a pair of camera modules disposed at a distance in the left-right direction of the vehicle, and acquires a pair of pickup images having parallax.

The image processing device 50 according to Embodiment 2 stores the pair of pickup images in the inclined state and an inclination angle in association with each other in the buffer area 10 in the storage unit 5. The synchronization management unit 22 in the buffer management unit 20 associates the pair of pickup images in the inclined state with the inclination angle.

The image generation unit 40 according to Embodiment 2 includes a parallax image generation unit 44. The parallax image generation unit 44 acquires the parallax of each pixel in the pair of pickup images, and acquires distance information in a depth direction from the image pickup unit 4 toward the front of the vehicle, from the acquired parallax. The parallax image generation unit 44 can map the distance information acquired for each pixel and generate a parallax image. The parallax image generation unit 44 generates a parallax image in an inclined state from the pair of pickup images in the inclined state, which are stored in the buffer area 10.

The image conversion unit 30 according to Embodiment 2 converts the pair of pickup images in the inclined state, which are stored in the buffer area 10, into a pair of pickup images in the non-inclined state by rotating the pair of pickup images in the inclined state in accordance with the inclination angle associated with the pair of pickup images in the inclined state. The image conversion unit 30 converts the parallax image in the inclined state into the parallax image in the non-inclined state by rotating the parallax image in accordance with the inclination angle associated with the pair of pickup images being the generation source of the parallax image in the inclined state.

The image generation unit 40 according to Embodiment 2 includes a matching image generation unit 43. The matching image generation unit 43 generates the matching image that is one of the recognition images.

The matching image generation unit 43 generates a matching image in the non-inclined state by using the pair of pickup images in the non-inclined state and the parallax image in the non-inclined state, which are converted by the image conversion unit 30. The matching image generation unit 43 specifies the position of the object in one of the pair of pickup images in the non-inclined state, based on the distance information contained in the parallax image in the non-inclined state. The matching image generation unit 43 can generate a matching image in the non-inclined state by cutting out a predetermined pixel area including the specified object from one of the pair of pickup images in the non-inclined state.

Figure 7:
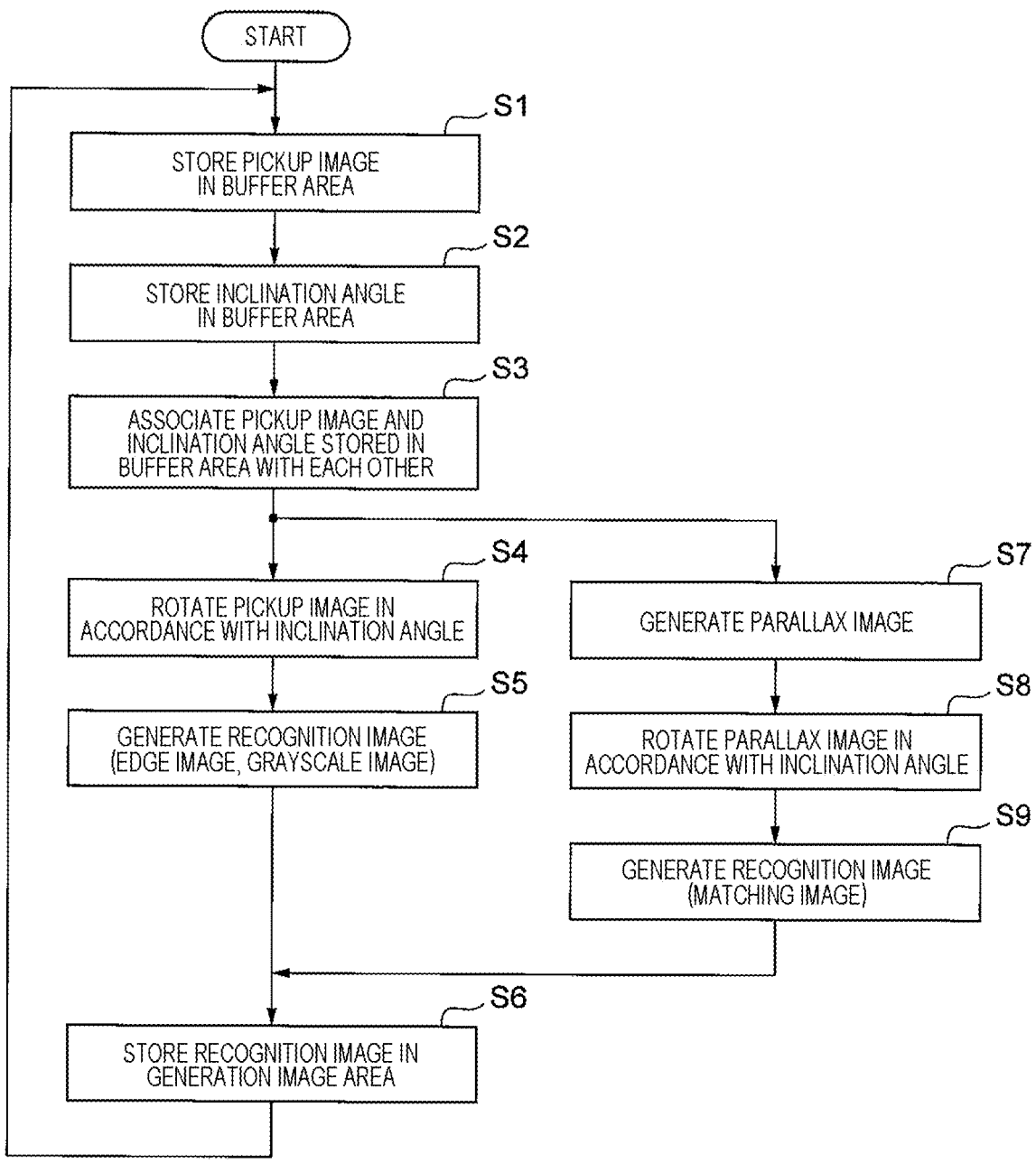
FIG. 7 is a flowchart illustrating a flow of processing performed by the image processing device illustrated in FIG. 6.

FIG. 7 is a flowchart illustrating a flow of processing performed by the image processing device 50 illustrated in FIG. 6.

The image processing device 50 according to Embodiment 2 performs processes similar to those of Steps S1 to S6 illustrated in FIG. 5, in Steps S1 to S6 illustrated in FIG. 7. In Step S5 illustrated in FIG. 7, the image processing device 50 generates an edge image or a grayscale image as the recognition image, from one of the pair of pickup images after the rotation processing (one of the pair of pickup images in the non-inclined state). After Step S3, the image processing device 50 performs the processes of Steps S7 to S9 in parallel with the processes of Steps S4 and S5.

In Step S7, the image processing device 50 generates a parallax image in the inclined state from the pair of pickup images in the inclined state, which are stored in the buffer area 10.

In Step S8, the image processing device 50 rotates the generated parallax image in the inclined state in accordance with the inclination angle associated with the pair of pickup images that is the generation source of the parallax image in the inclined state. Thus, the image processing device 50 can convert the parallax image in the inclined state into the parallax image in the non-inclined state.

In Step S9, the image processing device 50 generates a matching image as the recognition image from one of the pair of pickup images after the rotation processing (one of the pair of pickup images in the non-inclined state) and the parallax image after the rotation processing (parallax image in the non-inclined state). Then, the image processing device 50 causes the process to proceed to Step S6, and stores the matching image being one of the generated recognition images, in the generation image storage area 11 in the storage unit 5. An edge image, a grayscale image, and a matching image in the non-inclined state are stored in the generation image storage area 11. Then, the image processing device 50 repeats the processing illustrated in FIG. 7 for each predetermined pickup cycle of the image pickup unit 4.

As described above, even when the image pickup unit 4 includes a stereo camera, the image processing device 50 according to Embodiment 2 associates the pair of pickup images in the inclined state, which are stored in the buffer area 10, with the inclination angle, similar to Embodiment 1. Then, similar to Embodiment 1, the image processing device 50 according to Embodiment 2 converts the pair of pickup images in the inclined state, which are stored in the buffer area 10, into the pair of pickup images in the non-inclined state based on the inclination angle associated with the pair of pickup images in the inclined state, and generates the recognition image in the non-inclined state.

Thus, the image processing device 50 according to Embodiment 2 can always perform image recognition on the pickup image or the recognition image in the non-inclined state even though the posture of the vehicle changes from moment to moment, similarly to Embodiment 1. Accordingly, similar to Embodiment 1, the image processing device 50 according to Embodiment 2 can easily reduce the burden related to image recognition and obtain stable recognition performance, even though the posture of the vehicle changes from moment to moment.

Embodiment 3

A sensing system 100 according to Embodiment 3 will be described with reference to FIGS. 8 and 9. In the description of Embodiment 3, the description of the similar configuration and operation as those in Embodiment 2 will be omitted.

Figure 8:
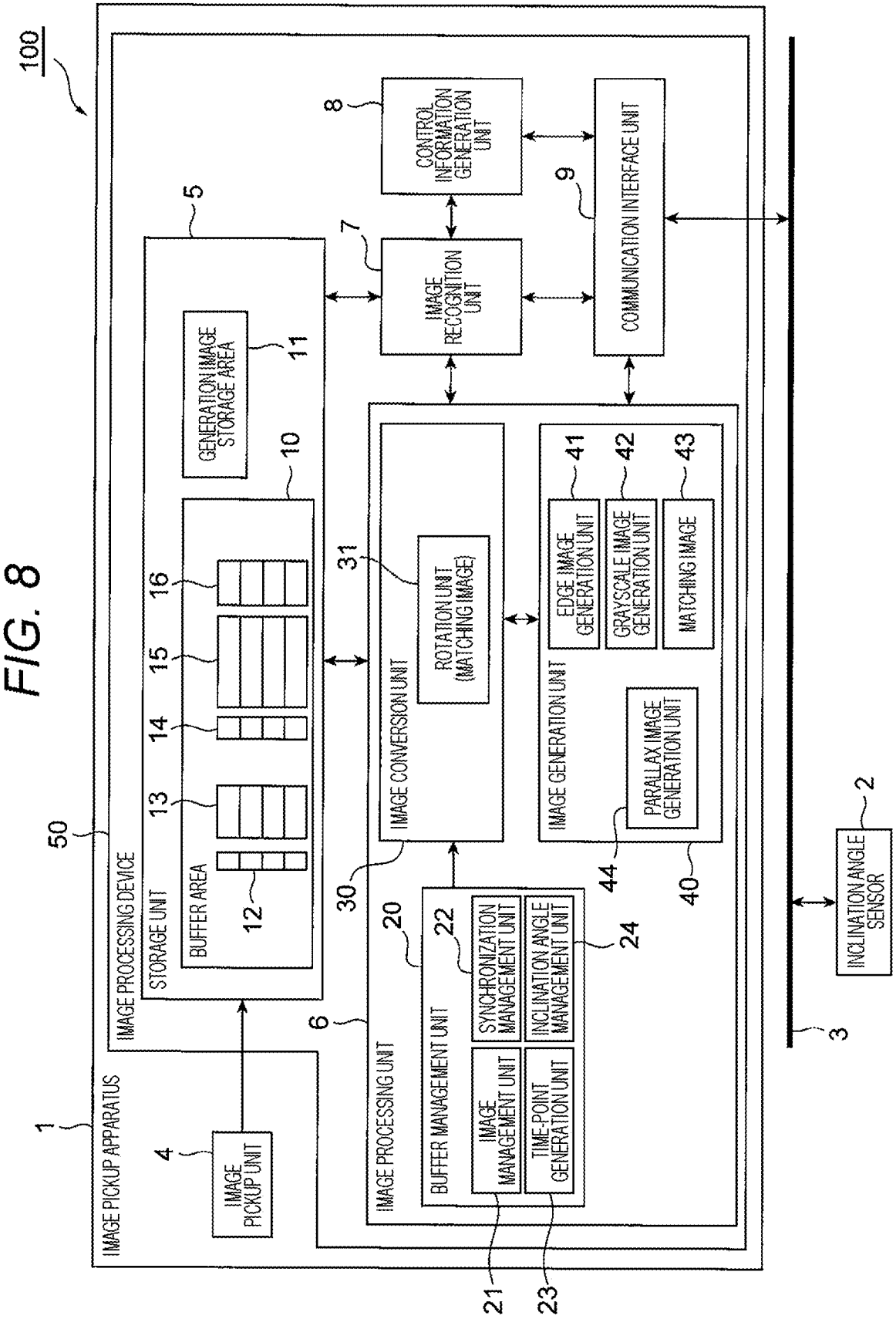
FIG. 8 is a configuration diagram of a sensing system including an image processing device according to Embodiment 3.

FIG. 8 is a configuration diagram of a sensing system 100 including an image processing device 50 according to Embodiment 3.

In the image pickup unit 4, in order to improve detection accuracy of a distant sign or the like, the number of pixels of the imaging element in the image pickup unit 4 tends to increase like 4K or 8K of the video standard, and the number of pixels of the pickup image tends to increase. When the number of pixels of the pickup image increases, the processing load related to the rotation processing of the pickup image and the parallax image increases. Therefore, it is desirable to reduce the rotation processing. In a case where the matching image used when the image recognition unit 7 performs image recognition remains in the inclined state, it is necessary to prepare an enormous number of learning images covering a large number of variations due to the difference in the inclination angle, and cause the identifier of the image recognition unit 7 to learn the learning images to create a dictionary.

Thus, differing from Embodiment 2, the image processing device 50 according to Embodiment 3 maintains a pair of pickup images, parallax images, edge images, and grayscale images to be in the inclined state, and performs the rotation processing only on the matching image. Since the image processing device 50 according to Embodiment 3 performs the rotation processing only on the matching image, it is possible to suppress an increase in the processing load and omit the invalidation unit 32 in the image conversion unit 30, and to simplify the configuration.

Specifically, similarly to Embodiment 2, the image processing device 50 according to Embodiment 3 stores a pair of pickup images in the inclined state and an inclination angle in association with each other in the buffer area 10 in the storage unit 5, and generates a parallax image in the inclined state from the pair of pickup images in the inclined state.

In the image generation unit 40 according to Embodiment 3, the matching image generation unit 43 generates a matching image in the inclined state by using the pair of pickup images in the inclined state and the parallax image. The image conversion unit 30 converts the matching image in the inclined state generated by the image generation unit 40 into a matching image in the non-inclined state by rotating the matching image in accordance with the inclination angle associated with the pair of pickup images that is the generation source of the matching image in the inclined state.

Figure 9:
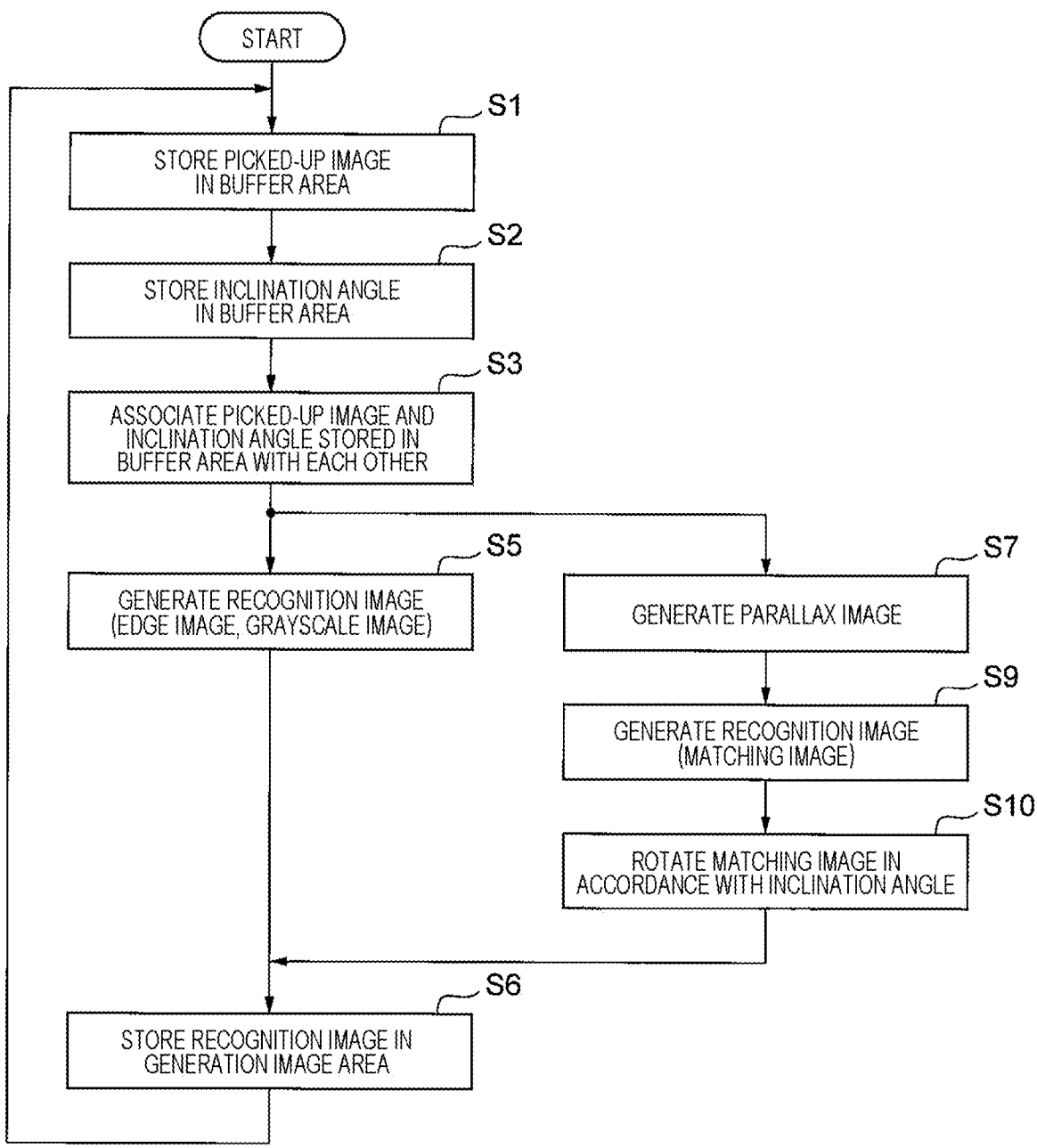
FIG. 9 is a flowchart illustrating a flow of processing performed by the image processing device illustrated in FIG. 8.

FIG. 9 is a flowchart illustrating a flow of processing performed by the image processing device 50 illustrated in FIG. 8.

The image processing device 50 according to Embodiment 3 performs processes similar to those of Steps S1 to S3, S5 to S7, and S9 illustrated in FIG. 7, in Steps S1 to S3, S5 to S7, and S9 illustrated in FIG. 9.

The image processing device 50 according to Embodiment 3 does not perform Steps S4 and S8 illustrated in FIG. 7. In Step S5 illustrated in FIG. 9, the image processing device 50 generates an edge image or a grayscale image in the inclined state as the recognition image, from one of the pair of pickup images in the inclined state. In Step S9 illustrated in FIG. 9, the image processing device 50 generates a matching image in the inclined state as the recognition image, by using the pair of pickup images in the inclined state and the parallax image in the inclined state.

In Step S10, the image processing device 50 rotates the generated matching image in the inclined state in accordance with the inclination angle associated with the pair of pickup images that is the generation source of the matching image in the inclined state. Thus, the image processing device 50 can convert the matching image in the inclined state into the matching image in the non-inclined state. Then, the image processing device 50 causes the process to proceed to Step S6, and stores the matching image being one of the generated recognition images, in the generation image storage area 11 in the storage unit 5. The edge image and the grayscale image in the inclined state, and the matching image in the non-inclined state are stored in the generation image storage area 11. Then, the image processing device 50 repeats the processing illustrated in FIG. 9 for each predetermined pickup cycle of the image pickup unit 4.

As described above, similarly to Embodiment 2, the image processing device 50 according to Embodiment 3 associates the pair of pickup images in the inclined state, which are stored in the buffer area 10, with the inclination angle. Then, differing from Embodiment 2, the image processing device 50 according to Embodiment 3 generates the matching image in the inclined state from the pair of pickup images in the inclined state, which are stored in the buffer area 10, and then converts the matching image in the inclined state into the matching image in the non-inclined state by rotating the matching image in the inclined state.

Thus, the image processing device 50 according to Embodiment 3 can always perform image recognition on the recognition image in the non-inclined state even though the posture of the vehicle changes from moment to moment. Furthermore, since the image processing device 50 according to Embodiment 3 performs the rotation processing only on the matching image, it is possible to suppress an increase in the processing load even when the number of pixels of the imaging element increases, and to simplify the configuration. Accordingly, the image processing device 50 according to Embodiment 3 can further easily reduce the burden related to image recognition and obtain stable recognition performance.

Embodiment 4

A sensing system 100 according to Embodiment 4 will be described with reference to FIGS. 10 to 12. In the description of Embodiment 4, the description of the similar configuration and operation as those in Embodiment 1 will be omitted.

Figure 10:
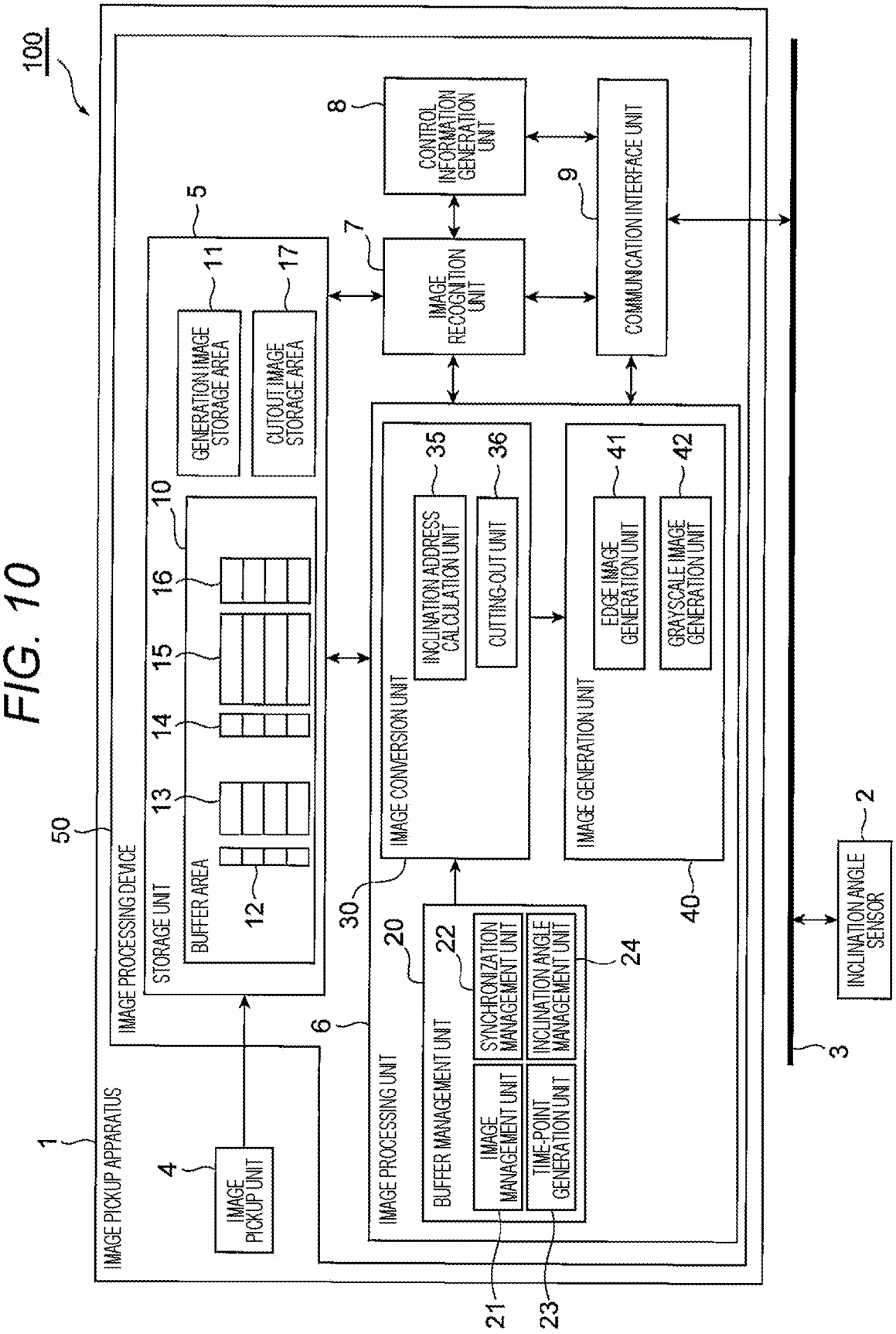
FIG. 10 is a configuration diagram of a sensing system including an image processing device according to Embodiment 4.
Figure 11:
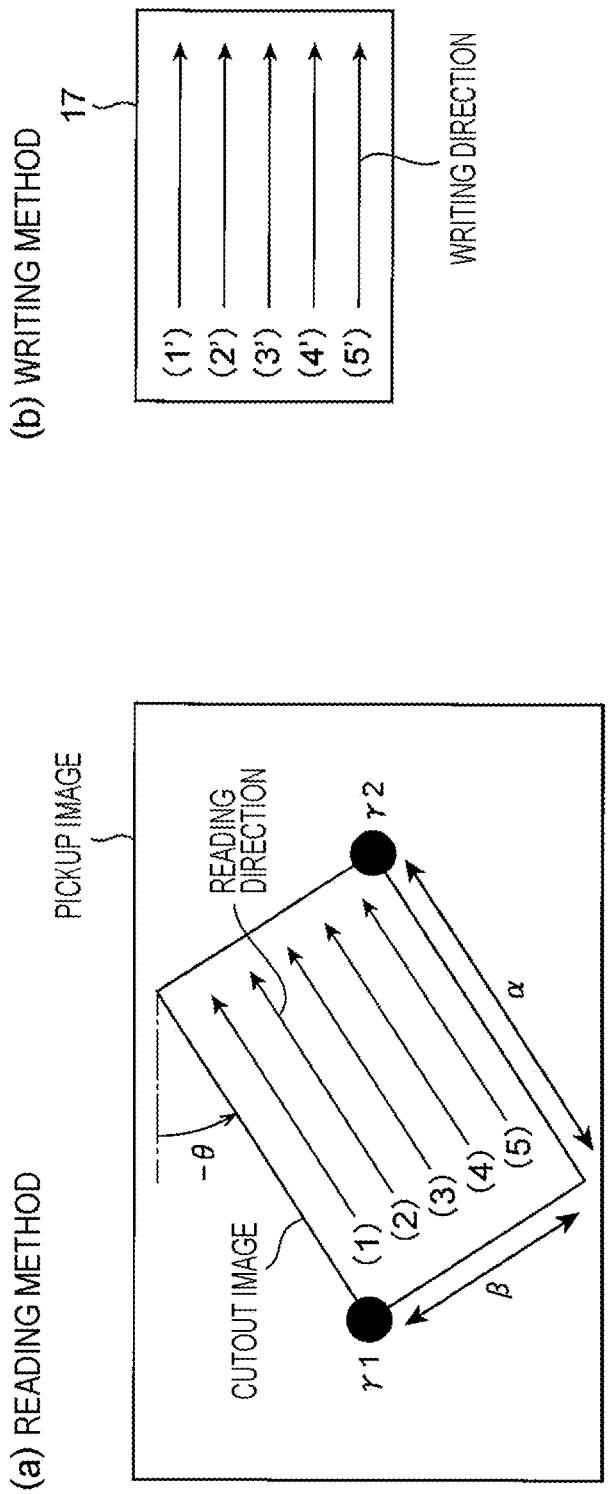
FIG. 11(a) is a diagram for explaining a method of reading each pixel value in a pixel area cut out from a pickup image in an inclined state.
FIG. 11(b) is a diagram for explaining a method of writing each pixel value read by the method illustrated in FIG. 11(a) into a storage unit.

FIG. 10 is a configuration diagram of a sensing system 100 including an image processing device 50 according to Embodiment 4. FIG. 11 is a view illustrating processing of the image conversion unit 30 illustrated in FIG. 10. FIG. 11(a) is a view for explaining a method of reading each pixel value of a pixel area cut out from the pickup image in the inclined state. FIG. 11(b) is a view illustrating a method of writing each pixel value read by the method illustrated in FIG. 11(a) into the storage unit 5.

In Embodiments 1 to 3, when the image conversion unit 30 performs the rotation processing of an image, the coordinate conversion of an image is performed in accordance with the inclination angle. Thus, there is a possibility that distortion occurs in the image after the rotation processing. Thus, in the image processing device 50 according to Embodiment 4, the image conversion unit 30 includes an inclination address calculation unit 35 and a cutting-out unit 36 instead of the rotation unit 31 that performs the rotation processing and the invalidation unit 32, and performs cutting-out processing of an image. Furthermore, in the image processing device 50 according to Embodiment 4, the storage unit 5 includes a cutout image storage area 17 which is a storage area different from the buffer area 10. The cutout image storage area 17 corresponds to an example of the second storage area in the present invention.

The image conversion unit 30 according to Embodiment 4 cuts out a portion of the pickup image from the pickup image in the inclined state, which is stored in the buffer area 10, in accordance with the inclination angle associated with the pickup image inclined state, and stores the image obtained by cutting, as a cutout image, in the cutout image storage area 17.

Specifically, the inclination address calculation unit 35 in the image conversion unit 30 according to Embodiment 4 calculates the address of a pixel area cut out as the cutout image from the pickup image in the inclined state. The pixel area to be cut out is a rectangular region, and is a region inclined in accordance with an inclination angle (−θ) detected by the inclination angle sensor 2 as illustrated in FIG. 11(a). The inclination address calculation unit 35 sets the address of the leftmost pixel (γ1) and the address of the rightmost pixel (γ2) in the cut-out pixel area, the size of the cut-out pixel area (α, β), and a reading direction indicating the order of the pixels from which each pixel value is read out from the cut-out pixel area. The inclination address calculation unit 35 sets, as the reading direction, a direction inclined by the inclination angle (−θ) with respect to the left-right direction (or the up-down direction) of the pickup image which is a default horizontal reading direction (or default vertical reading direction). In the example in FIG. 11(a), arrow directions of (1) to (5) indicate reading directions, and indicate that reading of each pixel value is completed in the arrow direction of (1), and then reading of each pixel value is sequentially performed in the arrow directions of (2) to (5). The inclination address calculation unit 35 calculates the address of each pixel arranged in the order along the set reading direction.

The cutting-out unit 36 in the image conversion unit 30 according to Embodiment 4 designates the addresses calculated by the inclination address calculation unit 35 in order along the reading direction, and reads each pixel value of the pixel area to be cut out. The cutting-out unit 36 writes the read pixel values in the cutout image storage area 17 in order along the reading direction. In the example of FIG. 11(b), arrow directions (1') to (5') indicate writing directions and correspond to the reading directions (1) to (5), respectively. The arrow directions (1') to (5') are set in the same direction as the left-right direction (or the up-down direction) of the pickup image which is the default horizontal reading direction (or default vertical reading direction). The example in FIG. 11(b) illustrates that writing of each pixel value is completed in the arrow direction of (1'), and then writing of each pixel value is sequentially performed in the arrow directions of (2') to (5'). Thus, the cutting-out unit 36 can convert the pickup image in the inclined state into the cutout image in the non-inclined state, similarly to the image on which the rotation processing has been performed.

The image generation unit 40 according to Embodiment 4 generates the recognition image such as the edge image or the grayscale image in the non-inclined state, from the cutout image in the non-inclined state, which is stored in the cutout image storage area 17.

FIG. 12 is a flowchart illustrating a flow of processing performed by the image processing device 50 illustrated in FIG. 10.

The image processing device 50 according to Embodiment 4 performs processes similar to those of Steps S1 to S3, S5 and S6 illustrated in FIG. 5, in Steps S1 to S3, S5 and 6 illustrated in FIG. 12. The image processing device 50 according to Embodiment 4 performs Step S11 instead of Step S4 illustrated in FIG. 5.

In Step S11, the image processing device 50 cuts out a portion of the pickup image from the pickup image in the inclined state, which is stored in the buffer area 10, in accordance with the inclination angle associated with the pickup image in the inclined state, and writes the image obtained by cutting, as a cutout image, in the cutout image storage area 17. Thus, the image processing device 50 can convert the pickup image in the inclined state into the cutout image in the non-inclined state. Then, the image processing device 50 causes the process to proceed to Step S5, and generates the recognition image in the non-inclined state from the cutout image in the non-inclined state, which is stored in the cutout image storage area 17. The generated recognition image is, for example, an edge image or a grayscale image. The image processing device 50 may generate another recognition image such as a matching image. Then, the image processing device 50 causes the process to proceed to Step S6 and stores the generated recognition image in the generation image storage area 11. Then, the image processing device 50 repeats the processing illustrated in FIG. 12 for each predetermined pickup cycle of the image pickup unit 4.

As described above, similarly to Embodiment 1, the image processing device 50 according to Embodiment 4 associates the pickup image in the inclined state, which is stored in the buffer area 10, with the inclination angle. Differing from Embodiment 1, the image processing device 50 according to Embodiment 4 cuts out a portion of the pickup image from the pickup image in the inclined state, which is stored in the buffer area 10, in accordance with the inclination angle associated with the pickup image in the inclined state, and converts the pickup image in the inclined state into the cutout image in the non-inclined state by writing the cutout image in the cutout image storage area 17. Then, the image processing device 50 according to Embodiment 4 generates the recognition image in the non-inclined state from the cutout image in the non-inclined state.

Thus, the image processing device 50 according to Embodiment 4 can always perform image recognition on the recognition image in the non-inclined state even though the posture of the vehicle changes from moment to moment. Furthermore, since the image processing device 50 according to Embodiment 4 performs the cutting-out processing instead of the rotation processing, it is possible to suppress distortion occurring in the image after the rotation processing. Accordingly, the image processing device 50 according to Embodiment 4 can easily reduce the burden related to image recognition and obtain stable recognition performance.

In the image processing device 50 according to the present embodiment, the image conversion unit 30 includes the inclination address calculation unit 35 and the cutting-out unit 36 instead of the rotation unit 31 and the invalidation unit 32, and performs the cutting-out processing instead of the rotation processing. The cutting-out processing may be performed in conjunction with the rotation processing, and the image processing device 50 according to Embodiments 1 to 3 may include the inclination address calculation unit 35 and the cutting-out unit 36 in conjunction with the rotation unit 31 and the invalidation unit 32.

Others

The present invention is not limited to the above embodiments, and various modification examples may be provided.

For example, the above embodiments have been described in detail in order to explain the present invention in an easy-to-understand manner, and the above embodiments are not necessarily limited to a case including all the described configurations. Further, some components in one embodiment can be replaced with the components in another embodiment, and the configuration of another embodiment can be added to the configuration of one embodiment. Regarding some components in the embodiments, other components can be added, deleted, and replaced.

Some or all of the configurations, functions, functional units, processing means, and the like may be realized in hardware by being designed with an integrated circuit, for example. Further, the above-described respective components, functions, and the like may be realized by software by the processor interpreting and executing a program for realizing the respective functions. Information such as a program, a tape, and a file, that realizes each function can be stored in a memory, a recording device such as a hard disk and a solid state drive (SSD), or a recording medium such as an IC card, an SD card, and a DVD.

Control lines and information lines considered necessary for the descriptions are illustrated, and not all the control lines and the information lines in the product are necessarily shown. In practice, it may be considered that almost all components are connected to each other.

REFERENCE SIGNS LIST 2 inclination angle sensor
4 image pickup unit
5 storage unit
6 image processing unit
10 buffer area
17 cutout image storage area
50 image processing device

The invention claimed is:

1. An image processing device comprising:
a memory that stores a pickup image acquired by an image pickup unit including an imaging sensor and a lens and mounted on a vehicle and an inclination angle transmitted from an inclination angle sensor that detects the inclination of the vehicle; and
a processor that performs image processing on the pickup image stored in the memory,
wherein the memory stores the pickup image in an inclined state, which is acquired by the image pickup unit inclined in accordance with the inclination angle of the vehicle,
the processor
associates the pickup image in the inclined state, which is stored in the memory, with the inclination angle based on a time difference between a time from when the inclination angle sensor detects the inclination angle until the detected inclination angle is stored in the memory, and a time from when the image pickup unit acquires the pickup image in the inclined state until the acquired pickup image is stored in the memory, and
generates a recognition image in a non-inclined state, which is used for image recognition of the pickup image, from the pickup image in the inclined state, which is stored in the memory, based on the inclination angle associated with the pickup image.

2. The image processing device according to claim 1, wherein
the image pickup unit acquires a plurality of the pickup images having different exposure times for each predetermined image pickup cycle, and
the processor
manages the plurality of pickup images as a group, and associates the same inclination angle with the plurality of pickup images managed as the group.

3. The image processing device according to claim 1, wherein
the processor
converts the pickup image in the inclined state into the pickup image in the non-inclined state by rotating the pickup image in accordance with the inclination angle associated with the pickup image, and
generates the recognition image in the non-inclined state, from the pickup image in the non-inclined state.

4. The image processing device according to claim 1, wherein
the image pickup unit includes a stereo camera and acquires a pair of the pickup images having parallax,
the memory stores the inclination angle and the pair of pickup images in the inclined state, which are acquired by the image pickup unit,
the processor
associates the pair of pickup images in the inclined state, which are stored in the memory, with the inclination angle,
generates a parallax image in the inclined state from the pair of pickup images in the inclined state, which are stored in the memory,
converts the pair of pickup images in the inclined state, which are stored in the memory, into the pair of pickup images in the non-inclined state by rotating the pair of pickup images in the inclined state in accordance with the inclination angle associated with the pair of pickup images,
converts the parallax image in the inclined state into the parallax image in the non-inclined state by rotating the parallax image in the inclined state in accordance with the inclination angle associated with the pair of pickup images being a generation source of the parallax image, and
generates the recognition image in the non-inclined state by using the pair of pickup images and the parallax image in the non-inclined state.

5. The image processing device according to claim 1, wherein
the image pickup unit includes a stereo camera and acquires a pair of the pickup images having parallax,
the memory stores the inclination angle and the pair of pickup images in the inclined state, which are acquired by the image pickup unit,
the processor
associates the pair of pickup images in the inclined state, which are stored in the memory, with the inclination angle,
generates a parallax image in the inclined state from the pair of pickup images in the inclined state, which are stored in the memory,
generates the recognition image in the inclined state by using the pair of pickup images and the parallax image in the inclined state, and
converting the recognition image in the inclined state into the recognition image in the non-inclined state by rotating the recognition image in the inclined state in accordance with the inclination angle associated with the pair of pickup images being a generation source of the recognition image.

6. The image processing device according to claim 1, wherein the memory includes a first storage area for storing the pickup image in the inclined state, which is acquired by the image pickup unit, and the inclination angle, and a second storage area different from the first storage area, and the processor cuts out a portion of the pickup image in accordance with the inclination angle associated with the pickup image, from the pickup image in the inclined state, which is stored in the first storage area, and writes a cutout image obtained by the cutting in the second storage area, to convert the pickup image in the inclined state into the cutout image in the non-inclined state, and generates the recognition image in the non-inclined state from the cutout image in the non-inclined state.

* * * * *